G. KOMAREK.
TRUCK SIDE FRAME.
APPLICATION FILED APR. 4, 1913.
1,068,670.
Patented July 29, 1913.
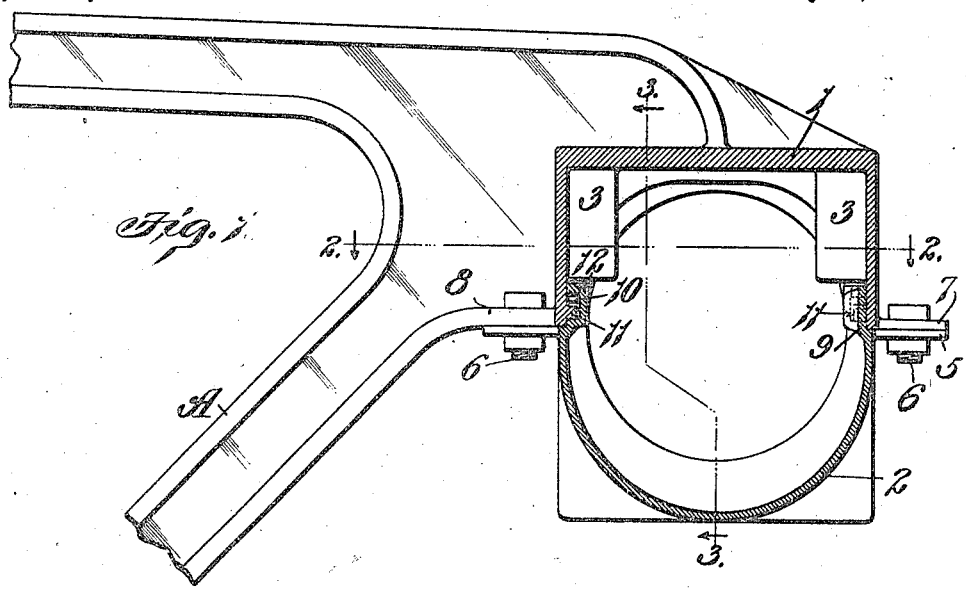
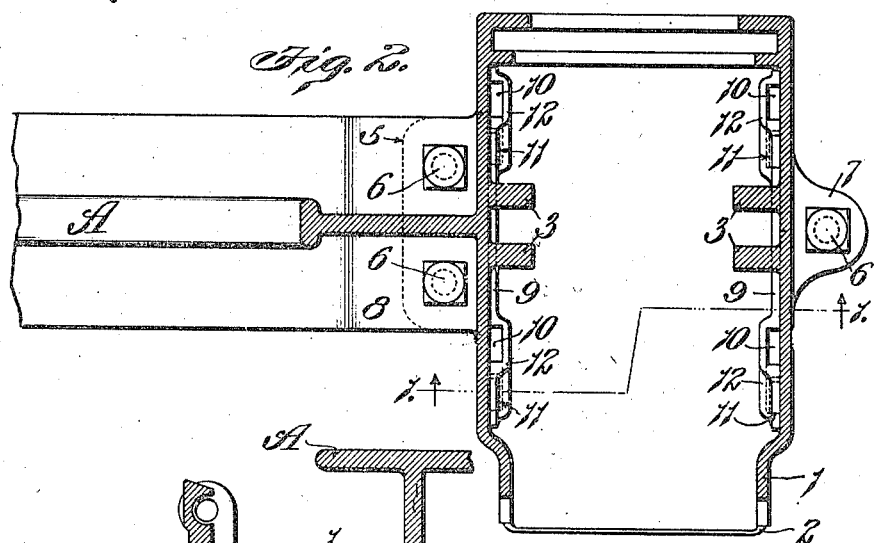
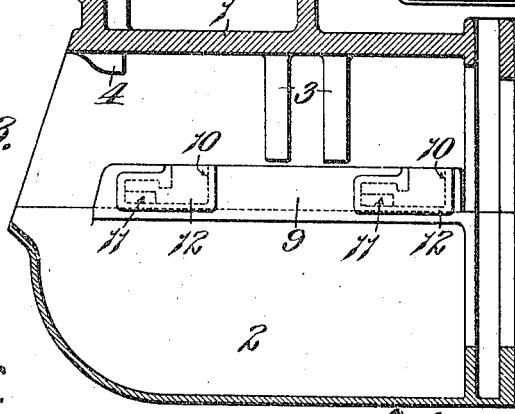
Witnesses:
Geo. R. Radson
C. M. Badger
Inventor,
Gustav Komarek
by Bakewell & Church attys

UNITED STATES PATENT OFFICE.

GUSTAV KOMAREK, OF ST. LOUIS, MISSOURI, ASSIGNOR TO CHARLES L. GILBERT, OF ST. LOUIS, MISSOURI.

TRUCK SIDE FRAME.

1,068,670.  Specification of Letters Patent.  Patented July 29, 1913.

Application filed April 4, 1913. Serial No. 758,960.

*To all whom it may concern:*

Be it known that I, GUSTAV KOMAREK, a citizen of the United States, residing at St. Louis, Missouri, have invented a certain new and useful Improvement in Truck Side Frames, of which the following is a full, clear, and exact description, such as will enable others skilled in the art to which it appertains to make and use the same.

This invention relates to truck side frames of the type in which the journal boxes are divided or formed in two parts, one part of each journal box usually being cast integral with the side frame and the other part being removable so that the wheel axles with the wheels thereon can be run longitudinally out of the truck without disconnecting the side frames from the other parts of the truck.

One object of my invention is to provide a side frame of the type referred to in which the journal boxes are so designed that it is not necessary to use felt or a similar packing material between the coöperating parts of the box in order to insure dust and oil-tight joints.

Another object is to provide a truck side frame which is so designed that the lower parts of the journal boxes cannot drop off or become completely detached from the top parts of the boxes in case the means that holds the two parts of the box together breaks or becomes lost while the truck is in service.

Other objects and desirable features of my invention will be hereinafter pointed out.

Figure 1 of the drawings is a side elevational view of a portion of a car truck side frame constructed in accordance with my invention; Fig. 2 is a horizontal sectional view taken on the line 2—2 of Fig. 1; Fig. 3 is a vertical transverse sectional view taken on the line 3—3 of Fig. 1.

Referring to the drawings which illustrate the preferred form of my invention, A designates a car truck side frame provided with horizontally divided journal boxes, each of which comprises a stationary top part 1 that is preferably formed integral with the side frame, and a removable lower part 2 that is detachably connected to the upper part of the box, thereby enabling the side frames of the truck to be jacked up high enough to permit the wheel axles with the wheels thereon to be run longitudinally out of the truck after the lower parts of the journal boxes have been removed. The stationary top part 1 of the box is preferably provided with integral side lugs or stops 3 that coöperate with the usual lugs on the side of the journal bearing, not shown, and also with stops 4 that coöperate with the journal bearing wedge, not shown, so that the top part of the journal box will receive all of the side shocks and end thrusts to which the journal bearing is subjected when in service. The removable lower part 2 of the box is substantially semi-cylindrical-shaped in cross section, as shown in Fig. 1, and it is provided at its upper end with laterally projecting flanges or ears 5 that receive removable fastening devices 6 which pass through a laterally projecting ear 7 on the top part 1 of the box and a horizontally disposed flange 8 on the side frame located adjacent the lower edge of the top part 1 of the box, as shown in Figs. 1 and 2, said fastening devices acting to retain the lower part of the box in operative position.

In order to insure tight joints between the top and bottom parts of the journal box without using felt or a similar packing material I have provided the lower part 2 of the box with upwardly projecting flanges or portions 9 that project upwardly into the top part 1 of the box and lap over the lower edge portions of the side walls of said top part 1, said flanges 9 being offset inwardly slightly with relation to the side walls of the lower part 2 of the box so as to form shoulders on which the lower edges of the side walls of the top part 1 bear when the removable part 2 of the box is in operative position, as shown in Fig. 2. In other words, the upper edges of the side walls 2 of the removable lower part of the box bear against the lower edges of the side walls of the stationary top part 1, and the upwardly projecting flanges 9 on said lower part 2 project upwardly beyond the joints between said edges so as to prevent the oil inside of the box from escaping through said joints or dust from entering the box through said joints. Bayonet-shaped slots 10 are preferably formed in the flanges 9 adjacent the ends of said flanges, as shown in broken lines in Fig. 3, and inwardly projecting lugs 11 are formed on the side walls of the stationary top part of the box, as shown in full lines in Fig. 1 and in broken lines in Fig. 3, said lugs or stops 11 projecting into said slots so as to prevent the lower part 2 of the box from dropping off or becoming completely detached from the top part 1 in case the fastening devices 6 break or become lost when the truck is in service. In order to eliminate the possibility of the oil escaping through the slots 10 and the flanges 9 I have provided the flanges 9 with integral pockets 12 which are arranged on the inner sides of said flanges 9, as shown clearly in Fig. 3. After the fastening devices 6 have been removed the lower part 2 of the box can be moved outwardly toward the left, looking at Fig. 3, far enough to bring the open ends of the slots 10 into vertical alinement with the inwardly projecting lugs 11 on the top part of the box and thus permit the bottom part 2 to be moved downwardly out of engagement with the stationary top part 1 of the box.

In assembling the box the removable bottom part 2 is arranged under the top part 1 and then moved upwardly so that the inwardly projecting lugs 11 on said top part will project into the bayonet-shaped slots 10 and the flanges 9. Thereafter, the removable bottom part 2 of the box is moved to the right, looking at Fig. 3, so as to position the lugs 11 at the inner ends of the bayonet-shaped slots 10. Finally, the fastening devices 6 are inserted so as to retain the removable bottom part 2 of the box in operative position. If the fastening devices 6 should break or become lost while the truck is in service the bottom part 2 of the box would merely drop downwardly a slight distance but would not become completely separated from the top part of the box owing to the fact that the lugs 11 project into the slots in the flanges 9, and in view of the fact that said slots are substantially bayonet-shaped, as shown in Fig. 3, it would be impossible for the bottom part 2 of the box to move outwardly or to the left in Fig. 3 after the lugs 11 had entered the recesses at the inner ends of the slots 10.

A side frame of the construction above-described comprises few parts and is inexpensive to manufacture; the journal-boxes of same are practically oil and dust-tight owing to the fact that the removable bottom part of each box is provided with portions that project upwardly into the top part of the box beyond the joints between the meeting edges of said parts; and still another desirable feature of such a construction is that it is impossible for the lower parts of the journal boxes to drop off or become lost when the truck is in use.

Having thus described my invention, what I claim as new and desire to secure by Letters Patent is:

1. A truck side frame provided with a horizontally divided journal box that comprises a stationary top part and a removable lower part, fastening means for securing said removable lower part in position, and coöperating interlocking portions on the top and bottom portions of the box that prevent the bottom part from dropping off in case said fastening means breaks or becomes defective.

2. A truck side frame having a horizontally divided journal box that comprises a stationary top part and a removable lower part, fastening means for securing said lower part in position, flanges on one part of the box that lap over the other part of the box, and lugs on said other part that project into slots or openings in said flanges and thus prevent the removable lower part of the box from dropping off in case said fastening means breaks or becomes defective.

3. A truck side frame having a horizontally disposed journal box that comprises a stationary top part and a removable lower part, fastening means for securing said removable lower part in position, flanges on said lower part that project upwardly into the top part of the box, and lugs on said top part that project into openings in said flanges.

4. A truck side frame having a horizontally divided journal box that comprises a stationary top part and a removable lower part, fastening means for securing said lower part in position, integral upwardly projecting flanges on said lower part that lap over the side walls of the top part of the box, said flanges being provided with substantially bayonet-shaped slots, and lugs on the top part of the box that project into said slots and thus prevent the lower part of the box from dropping off in case said fastening means breaks or becomes defective.

5. A truck side frame provided with a horizontally divided journal box that comprises a stationary top part and a removable lower part, offset flanges on said lower part that project upwardly into the stationary top part of the box, said flanges being provided with openings, pockets on the inner sides of said flanges that act as closures for said openings, and devices on the top part of the box that project through said openings into said pockets.

6. A truck side frame having a horizontally divided journal box that comprises a stationary top part and a removable lower part having side walls whose meeting edges butt against each other, coöperating interlocking portions on the side walls of said parts arranged in such a manner that the removable lower part has to be moved horizontally with relation to the top part of the box to assemble the box, and independent means for retaining the removable lower part of the box in operative position.

In testimony whereof I hereunto affix my signature in the presence of two witnesses, this 29th day of March 1913.

GUSTAV KOMAREK.

Witnesses:
E. A. JUDGE,
WM. S. BRIDGEMAN.